United States Patent

Bäckskog

[11] 4,096,628
[45] Jun. 27, 1978

[54] METHOD FOR MAINTAINING THE POSITIONING OF ELECTRICAL ELEMENTS WITHIN A CONTAINER

[75] Inventor: Hans Bäckskog, Ludvika, Sweden

[73] Assignee: Asea AB, Vesteras, Sweden

[21] Appl. No.: 752,281

[22] Filed: Dec. 20, 1976

[30] Foreign Application Priority Data

Dec. 23, 1975 Sweden .............................. 7514608

[51] Int. Cl.² ........................................... H01R 43/00
[52] U.S. Cl. ..................................... 29/628; 29/25.13;
29/592 R; 174/10; 206/334; 206/521; 361/127; 403/12
[58] Field of Search ..................... 29/628, 25.13, 592; 206/334, 521, 583, 585; 174/10; 361/127, 128; 285/23; 403/12

[56] References Cited

U.S. PATENT DOCUMENTS

| 3,715,626 | 2/1973 | Olsen | 361/128 |
| 3,875,466 | 4/1975 | Jakst | 361/127 X |

*Primary Examiner*—Carl E. Hall
*Attorney, Agent, or Firm*—Watson, Cole, Grindle & Watson

[57] ABSTRACT

Electrical devices which include electrical elements positioned within a container are assembled at the manufacturing site and then transported to the erection site by forming the container with openings therein such that transport supports can be inserted therethrough to contact the electrical elements. The transport supports may then be secured in place between the elements and the container walls. Upon erection into functioning position, the transport supports are removed and the openings covered with lids so that, if desired, the container can then be filled with gas.

8 Claims, 5 Drawing Figures

METHOD FOR MAINTAINING THE POSITIONING OF ELECTRICAL ELEMENTS WITHIN A CONTAINER

BACKGROUND OF THE INVENTION

The present invention relates to a method of, and means for, assembling and transporting an elogate electrical device composed of a plurality of elements which are arranged in a cylindrical metal enclosure and, when in operating position, are secured to the enclosure by only the ends thereof.

Certain large electrical elements which function in an enclosed, gas-insulated switchgear cannot be simply transported in an already assembled condition within their enclosures. This applies, for example, to metal-enclosed surge arresters. The active elements of these arrestors, when operational, are suspended within their enclosure at one end from an epoxy insulator. Both the insulator and the elements forming the surge arrester, however, become increasingly sensitive to dynamic stress with increasing length of the apparatus. Normally such a device is assembled vertically, but since it can be up to seven meters in length (with an operating voltage in the order of 800 kilovolts), it usually cannot be transported in this position. On the other hand, it is advantageous for such a device to be assembled at the manufacturing location in view of the requirements of cleanliness.

SUMMARY OF THE INVENTION

The object of the present invention is to effect a method of transporting electrical devices which include elements therein which, when operational, are positioned within an enclosed container, and which method enables the devices to be fully assembled at the manufacturing site and transported to the erection site without the dynamic stress on the elements and pin insulators becoming too great.

The foregoig is achieved by positioning transport supports in contact with the electrical apparatus within the enclosed container by inserting the transport supports through openings in the wall of the enclosed container in a radial fashion. The supports, after securing, thus provide support for the electrical apparatus when in transport. Upon arrival at the erection site, the ends of the electrical apparatus are secured, the transport supports are removed, and the openings in the walls of the enclosed container plugged.

The method according to the invention offers the following advantages:

(a) The electrical device can be fully assembled in a vertical position, but can be transported and used in a horizontal position.

(b) The dynamic stress on the epoxy insulators at the ends of the device and the elements of the apparatus itself is minimized.

(c) The final mechanical adjustment of the device at the manufacturing site is facilitated.

(d) Requisite transport supports can be fitted and removed from the outside of the enclosure and necessary apertures can be relatively small.

Further objects, advantages, and features of the invention will be apparent in the arrangement and construction of the constituent parts in detail as set forth in the following specification taken together with the accompanying drawings.

DETAILED DESCRIPTION OF A PREFERRED EMBODIMENT

Figure 4:
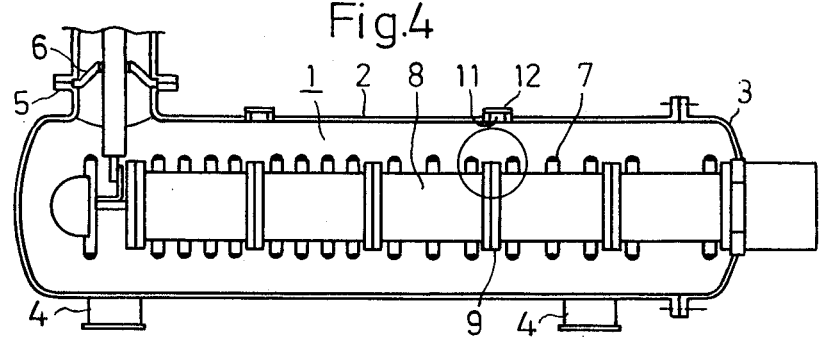
FIG. 4 shows the surge arrester in operation.
Figure 5:
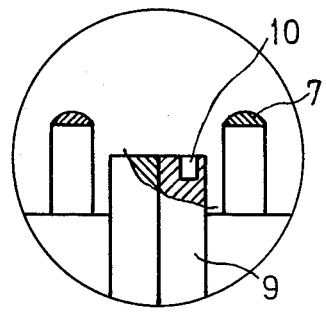
FIG. 5 on the detail indicated by the ring in FIG. 4 o an enlarged scale.

Referring initially to FIG. 4 of the drawings, this Figure shows a surge arrester 1 for an $SF_6$-insulated high-voltage switchgear, arranged in a cylindrical metal container 2 provided with end part 3, assembly feet 4 and flange 5 for connection to the rest of the switchgear. The righthand end of the surge arrester is secured in the end part 3 and, when ready for operation, the other end is supported by an epoxy insulator 6, fitted together with the flange 5. The surge arrester is surrounded by screening rings 7. The active parts of the surge arrester comprise a number of modules 8 connected together and which include spark-gaps and voltage-dependent resistors. The modules have metal flanges 9 at the ends. Radially directed bottom recesses 10 (FIG. 5) are cut in these flanges. Since the recesses 10 are closer to the center line than the screens 7, the field strength at the recesses will be low and they can therefore be left open while in operation. In alignment with the bottom recesses 10 are small apertures 11 in the container 2. The apertures 11 are covered by small lids 12.

Figure 1:
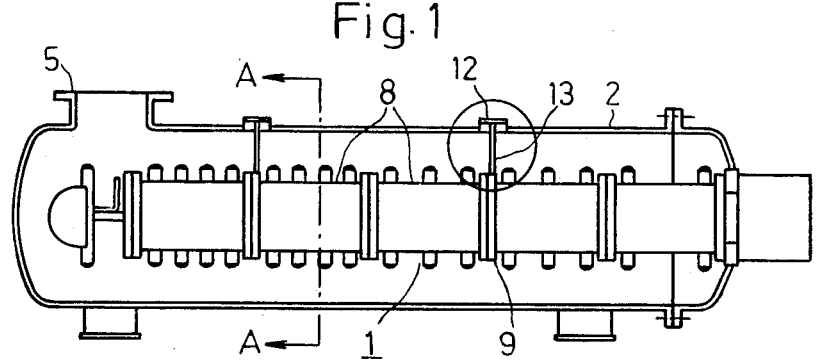
FIG. 1 shows a metal-enclosed surge arrester prepared for transport according to the present invention.
Figure 2:
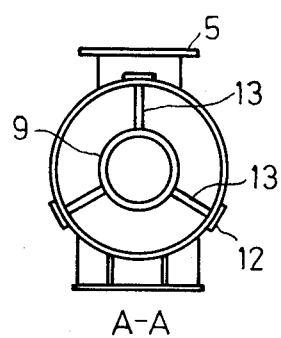
FIG. 2 shows a cross-sectional view through the surge arrester along line A—A of FIG. 1.
Figure 3:
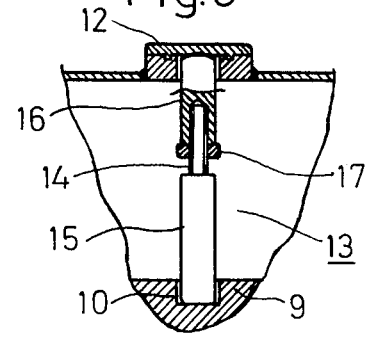
FIG. 3 shows the detail indicatd by the ring in FIG. 1 on an enlarged scale.

FIGS. 1 to 3 show the arrester in position for transport, pins 13 having been inserted through the apertures 11 into the recesses 10 in order to support the modules during transport. These pins are secured on the outside of the container, the design being such that the position of the pins can be adjusted laterally to a certain extent. The bottom recess 10 in the flange is preferably not threaded in order to reduce the risk of metal filings inside the container. FIG. 2 reveals three pins in the same flange, spaced 120° in the same plane perpendicular to the longitudinal axis of the arrester container. However, several other suitable arrangements of the pins are feasible.

FIG. 3 shows an example of how the transport support 13 may be constructed. The support shown consists of a peg 15 provided with a threaded end section 14, onto which an extension piece 16 with internal threading can be axially screwed. When the support has been adjusted to the correct length, the extension part 16 is locked on the peg 15 by means of a counter-nut 17.

A surge arrester of the type to which the invention relates may have a length of 7 meters and the diameter of the container 2 may be about 1 meter. The arrester is intended to be fully assembled in the factory, the modules 8 being stacked vertically and joined by, for instance, screw joints. The cylinder 2 is then positioned around the vertical arrester and secured by means of an epoxy insulator in the correct position in relation to the arrester. The transport supports 13 are then applied and the module stack once again freed from the epoxy insulator. The metal-enclosed surge arrester is then placed in a horizontal position and transported to the erection site where the adjustability of the transport supports is used in order to get the horizontal arrester stack in the correct position. When the arrester stack has been secured in the epoxy insulator, the transport pins are removed (from the outside of the casing) and the lids 12 fitted.

I claim:

1. A method of assembling and transporting an electrical device which, when operational, includes electrical elements within a container, comprising the steps of arranging the electrical elements within a container which has openings in the walls thereof at predetermined locations, inserting transport supports radially through the openings in the walls of the container in order to contact the electrical elements therein, securing the transport supports between the container and the electrical elements, transporting the electrical device to an erection site, removing the transport supports from within the container, and covering the openings in the walls of the container.

2. The method of claim 1 wherein after the electrical device has been transported to the erection site and prior to removal of the transport supports the electrical device is connected for operation.

3. The method of claim 2 wherein the container is an elongated metal container, wherein during the arranging of the electrical elements within the contaier the elongated portion of the container is positioned in a vertical orientation, and wherein said arranging of said electrical elements comprises stacking said elements one at a time within the container in a vertical direction.

4. The method of claim 3 wherein the electrical device is transported to the erection site with the elongated portion in a horizontal orientation.

5. The method of claim 4 wherein the container includes several openings in the same plane perpendicular to the elongated direction of the container such that after insertion of the transport supports the electrical elements have several points of support in the same radial plane.

6. The method of claim 5 wherein the electrical device is connected for operation by connection of one end thereof to a support insulator.

7. The method of claim 6 wherein the electrical elements include flanges at the ends thereof such that when stacking the flanges of adjacent elements contact one another, said flanges including recesses therein, the elements being stacked such that the recesses are positioned adjacent the openings in the container, and the transport supports are inserted through the openings such that peg ends thereof fit into the recesses.

8. The method of claim 7 wherein the transport supports are secured by covering the openings through whih the supports are inserted, the supports having been adjusted to the desired length, such that the cover positions the support in place.

* * * * *